United States Patent Office 3,418,287
Patented Dec. 24, 1968

3,418,287
CONDENSATION POLYMERS FROM 1,2-CYCLO-
PROPANE DICARBOXYLIC ACID
Peter William Foster, Wilmington, Del., assignor to E. I.
du Pont de Nemours and Company, Wilmington, Del.,
a corporation of Delaware
No Drawing. Filed Apr. 29, 1963, Ser. No. 276,167
6 Claims. (Cl. 260—78)

This invention relates to a novel class of condensation polymers and more particularly to fiber-forming condensation polymers containing 1,2-cyclopropane rings.

The use of condensation polymers to produce synthetic fibers is now well known. As a class the condensation polymers are best described as those polymers which can be formed with elimination of small molecules, e.g., $H_2O$, HCl, NaCl, $NH_3$, $CO_2$ and the like, and/or which yield upon chemical degradation (e.g., hydrolysis) monomeric end products differing in composition from the structural unit of the polymer. In general, the condensation polymers differ in molecular structure from the addition polymers in that the latter have intralinear chains formed almost exclusively of carbon atoms.

Of the linear fiber-forming condensation polymers, the polyamides have achieved the greatest commercial success. The commercial polyamides such as 66 and 6 nylon are based on aliphatic intermediates, and are particularly outstanding in terms of strength, flexibility and toughness properties. Since for certain purposes these polyamides have unduly low modulus values, it has heretofore been suggested to remedy this defect by the utilization of starting materials containing aromatic or cycloaliphatic rings. While these techniques have served to stiffen the polymer chain in many cases, such improvements are often found to be attended by a corresponding sacrifice in other desirable properties, e.g., by an increase in melting point and melt viscosity, and by a decrease in solubility (in spinning solvents) and dyeability. An exceptionally favorable compromise between these effects is shown by the commercial polyester, polyethylene terephthalate.

It has also been recognized that decreasing the number of carbon atoms between hydrogen bonding linking groups (e.g., amido groups) increases dimensional stability by increasing the effective, hydrogen bonding between adjacent polymer chains. This result is attained because the ratio of polar links to chain carbon is increased. This result, too, may have undesirable consequences in raising the polymer melting point; for example, polyamides from aliphatic diamines and adipic acid have melting points of 230° C., 264° C., and 278° C. for diamines of 10, 6 and 4 carbons, respectively (Rowland Hill, "Fibers From Synthetic Polymers, Elsevier (1953), page 135). In contrast, the corresponding polymer from ethylene diamine melts considerably higher at about 305 to 310° C., which is above the desirable temperature for melt spinning.

In accordance with the present invention, there is provided a novel class of fiber-forming synthetic linear condensation polymers characterized by recurring 1,2-cyclopropane rings forming an integral part of the polymer chain; that is, the basic structural unit of the polymer chain comprises a plurality of cyclopropane radicals linked by polar groups such as amido, urethane, urea, or ester groups. The 1,2-cyclopropane rings may be present in either or both of complementary difunctional reactants to give a polymer of the —AA—BB— type, corresponding in molecular arrangement to polyhexamethylene adipamide, for example.

More specifically, the products of the invention are fiber-forming linear condensation polymers composed of recurring structural units of the formula

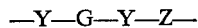

wherein the Y's are chemically identical linkages and are selected from the group consisting of divalent amido, urethane, ureylene and ester radicals, G is

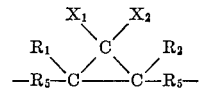

Z is selected from the group consisting of G and divalent aromatic, aliphatic, cycloaliphatic and mixed aliphatic-cycloaliphatic groups having at least four carbon atoms in each ring; $X_1$ and $X_2$ are selected from the group consisting of hydrogen, lower alkyl, lower alkoxy, phenyl, cycloaliphatic radicals and radicals which together and with the adjacent carbon atom of the cyclopropane nucleus form a cycloaliphatic radical; $R_1$ and $R_2$ are selected from the group consisting of hydrogen, lower alkyl, lower alkoxy, and phenyl; and $R_5$ is selected from the group consisting of a valence bond and alkylene radicals of one to three carbons.

The 1,2-cyclopropane containing polymers of the foregoing recurring structural units are prepared from appropriately selected complementary difunctional reactants by a variety of known condensation polymerization techniques. As will be illustrated in greater detail in the examples, the class of polycarbonamides, i.e., those polymers containing intralinear divalent amido linkages of the formula

represent a preferred embodiment of the invention for the reason that fibers formed thereof possess exceptionally valuable properties. Polyurethanes, polyureas, and polyesters, which contain respectively (as the Y symbols of the above formula) intralinear urethane linkages,

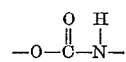

ureylene linkages,

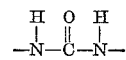

and ester linkages,

may also, however, be prepared in accordance with the invention.

It will be apparent from the above formula that the invention contemplates polymers having molecular chains wherein the 1,2-cyclopropane rings give rise to either a cis or trans configuration or to mixtures of both in the same or different chains. In general, however, the preferred polymers of the invention are prepared from 1,2-cyclopropane derivatives which have the trans configuration with each $R_5$ radical being a valence bond. Not only do these derivatives minimize imide or anhydride formation during polymerization, but also they tend to increase the ability of oriented fibers to crystallize; hence, provide improved dimensional stability. When $R_5$ is alkylene, e.g., methylene, ethylene or trimethylene, either the cis or trans-configuration may be employed. In any case better fiber properties are usually obtained when a single isomer (rather than a mixture) is employed.

With respect to the above formula describing the recurring structural units of the polymers of the invention, the term "lower" as applied to alkyl and alkoxy denotes such radicals containing 1 to 4 carbons. Where the radicals $R_1$, $R_2$, $X_1$ and $X_2$ are of the aromatic or cycloaliphatic variety, they may be ring substituted, for example by aliphatic groups.

The preferred fiber-forming linear polycarbonamides of the invention are prepared from two complementary difunctional reactants, only one of which contains a 1,2-cyclopropane ring. These polymers thus contain recurring structural units of the formula

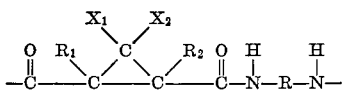

wherein values of $R_1$, $R_2$, $X_1$ and $X_2$ are as hereinbefore defined and wherein R is selected from the group consisting of divalent aromatic, aliphatic, cycloaliphatic and mixed aliphaticcycloaliphatic groups having at least four carbon atoms in each ring. Again, the polymers of that structure having the trans-configuration exhibit the most desirable properties for fiber formation. Particularly this is true when $R_1$, $R_2$, $X_1$ and $X_2$ are each hydrogen atoms, e.g., when the carboxylic reactant is cyclopropane-1,2-dicarboxylic acid or an amide forming derivative thereof. With the latter acid or its derivatives an especially valuable class of polycarbonamides is formed with diprimary aliphatic diamines; that is, such that R thus constitutes a —$C_nH_{2n}$— radical of two to twelve carbons.

The polymers of the invention are preferably formed of dicarboxylic acids of the formula HOOC—G—COOH, alternatively amide forming derivatives thereof, wherein G is as hereinbefore described. Typically suitable derivatives of the dicarboxylic acids include the diacid halides, dicarboxylic acid esters, diamides, etc. Examples of suitable dicarboxylic acids include cyclopropane-1,2-dicarboxylic acid; 3-methylcyclopropane-1,2-dicarboxylic acid; 3-ethyl cyclopropane-1,2-dicarboxylic acid; 3-propyl cyclopropane-1,2-dicarboxylic acid, 3-phenyl cyclopropane-1,2-dicarboxylic acid; 2-methylcyclopropane-1,2-dicarboxylic acid; 2-methyl-3-phenyl cyclopropane-1,2-dicarboxylic acid; 1,2-dimethyl-3-ethyl-cyclopropane - 1,2-dicarboxylic acid; 2-methoxy cyclopropane-1,2-dicarboxylic acid; spiro [2,5]octane-1,2-dicarboxylic acid and 3-methoxy cyclopropane-1,2-dicarboxylic acid. Still other suitable dicarboxylic acids are exemplified by cyclopropane-1,2-diacetic acid; cyclopropane-1-propionic-2-carboxylic acid; 2-methyl cyclopropane-1,2-diacetic acid and 3-ethoxycyclopropane-1,2-dibutyric acid.

Apart from the utilization of the foregoing dicarboxylic acids, as for example in the production of polyesters or polyamides, it is also possible to prepare the corresponding diprimary diamines of those acids, e.g., via the Hofmann reaction as performed with alkaline sodium hypobromite upon the corresponding diamides of the acids. Such diamines can then be reacted with diisocynates, i.e. of the formula OCN—Z—NCO, or bischloroformates, i.e. of the formula

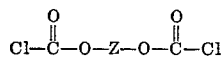

to yield corresponding polyurethanes and polyureas respectively. An alternative route to the polyureas involves condensation of the aforementioned diamines with phosgene; in this case the divalent groups Z and G of the recurring structural units of the polymer will be identical.

The various 1,2-cyclopropane containing dicarboxylic acids and their amide forming derivatives as described above can be reacted with a variety of diamines for the production of the preferred polycarbonamides of this invention. Although such diamines, i.e., of the formula $H_2N$—Z—$NH_2$, can also contain a 1,2-cyclopropane ring, other types are normally more suitable for achieving valuable fiber properties, e.g., ethylenediamine, hexamethylenediamine, 2-methyl hexamethylenediamine, p-cyclohexanediamine, meta-phenylenediamine, bis(p-aminocyclohexyl)methane,4,4'-diamino-2,2' - bicyclohexyl propane. Typical examples of dicarboxylic acids which are useful for reaction with diprimary diamines containing a 1,2-cyclopropane ring include succinic acid, adipic acid, sebacic acid, terephthalic acid, isophthalic acid, p-dicarboxy cyclohexane, bis(p-carboxy cyclohexyl)methane, etc.

For the preparation of polymers containing intralinear ester linkages, the 1,2-cyclohexane dicarboxylic acids or ester forming derivatives thereof may be reacted with diols of the formula OH—Z—OH. Because the aliphatic diols such as ethylene glycol tend to give lower melting polymers, carbocylic diols such as 1,4-cyclohevanebis(methanol) are more desirable.

Typical examples of diisocyanates and bischloroformates which can be reacted with the above described diprimary diamines containing a 1,2-cyclopropane ring to yield polyurethanes and polyureas, respectively, include hexamethylene diisocyanate, bis(p - isocyanatophenyl) methane and ethylene bischloroformate.

As described above, polymerization is preferably effected in the melt or solid phase, such requiring merely conventional procedures. In some cases it may, however, be desirable to include high boiling solvents, plasticizers or the like. Similarly, it is preferred that filaments made from the polymers of this invention be shaped by melt spinning, for which most are well suited. This is due to their reasonable melting points and to their good thermal stability characteristics. It will be understood, nevertheless, that many of the polymers may advantageously be wet or dry spun.

As previously pointed out, it is desirable to use a single isomer of the 1,2-cyclopropane reactants, preferably the trans, in preparing the polymers of this invention. The isomers are conveniently separated by fractional crystallization, the trans-isomer from acetonitrile and the cis from nitromethane. The use of separated isomers is especially favorable for obtaining suitable 1,2-cyclopropane containing reactants, since there is no conversion from cis to trans once the compound is made.

It is a surprising feature of the invention that the majority of the 1,2-cyclopropane ring-containing polymers are melt-spinnable, since monomeric cyclopropane derivatives have not usually been noted for good thermal or chemical stability properties. The stability characteristics of such derivatives have generally been thought to more nearly resemble materials such as ethylene than the larger ring carbocyclic compounds such as cyclohexane. Unexpectedly, the polymers of the invention will generally form fibers from the melt, even though their melting temperatures be 300° C.

A further surprising feature of the novel polymers of the invention is particularly evident upon comparison with prior art polymers of related structure. In this respect the polyamide of hexamethylene diamine and succinic acid (6–4 nylon) is in marked contrast to the polyamide of hexamethylene diamine and 1,2-cyclopropane dicarboxylic acid even though the carboxylic derived chain portions of each polymer contain two carbons directly linking the carbonyl groups together. Thus the 6–4 nylon cannot be heat-polymerized to a high molecular weight polymer due to imide formation which terminates the polymer chains (see V. V. Korshak, loc. cit.). If the same polymer is polymerized by low temperature techniques (e.g., interfacial polymerization), filaments cannot be suitably melt-spun; if wet or dry spun, fabrics cannot readily be heat set, due to this type of decomposition. In contrast, hexamethylene diamine and cyclopropane-1,2 dicarboxylic acid are readily polymerized in the solid phase at 255° C. to yield a polymer having a melting temperature of 299° C.

Although the invention contemplates copolymers, as for example by the utilization of two or more different diamines for condensation with a 1,2-cyclopropane containing dicarboxylic acid with or without an additional dicarboxylic acid, the intralinear functional linkages, e.g., Y of the formulas, of any polymer should generally be the same in that polymer. Moreover, it is preferred that the polymers of the invention should consist essentially of recurring structural units as hereinbefore described;

that is, except for terminal groups the polymer molecules should be largely free of other units. It will be understood, however, that the polymers can be modified or otherwise treated as by the inclusion of plasticizers, other polymers, dyes, pigments, fillers, delustrants, stabilizers, antioxidants, U.V. acceptors and the like.

Fibers produced from the polymers of the invention are suitable for continuous filament yarn, monofil, floc, staple, tow, batting fiberfill and the like. They may be used in hose, woven or knitted goods, cords for reinforcing or other purposes, bristles and the like.

The polymers may also be molded, extruded, cast, pressed or otherwise shaped into useful articles. Extruded films may be oriented by stretching; these then being suitable for protective wrapping purposes.

Although the practice of the invention will be illustrated in detail in the following examples, it is not to be construed as being limited thereby. Parts therein are by weight unless otherwise stated. Viscosity values are determined at 25° C. upon samples of 0.5 gram of polymer per 100 ml. of solution.

A. PREPARATION OF THE POLYAMIDE SALTS

Example 1

5.83 grams trans-1,2-dicarboxy cyclopropane (commercially available) are dissolved in 20 ml. warm absolute ethanol; 5.2 grams hexamethylenediamine are dissolved in 20 ml. absolute ethanol, and the solutions are mixed. The salt oils out of solution, and on standing, crystallizes to a white solid with a melting point of 202–204° C.

Example 2

6.9 grams trans-1,2-dicarboxy cyclopropane are dissolved in 20 ml. ethanol, 7.0 grams 2-methyl hexamethylenediamine are dissolved in 20 ml. ethanol, and the solutions are mixed. After cooling to 5° C. for 6 days, 13.9 grams salt, M.P. 110–118° C., is filtered off.

Example 3

86.1 gm. bis(p-aminocyclohexyl)methane (mixed isomers containing 70% trans-trans isomer) as an 80% solution in methanol is added to 43.1 grams trans-1,2-dicarboxy cyclopropane in 95% ethanol. The salt precipitates by the addition of benzene.

Example 4

1,1-diphenyl-trans-2,3-cyclopropane dicarboxylic acid is prepared by the method of J. Van Alphen, Rec. Trav. Chim. 62, 210 (1943) (see also J. Am. Chem. Soc. 81, 3776 (1959)).

20.6 grams hexamethylenediamine are added to a solution of 50 grams of the 1,1-diphenyl-trans-2,3-cyclopropane dicarboxylic acid in hot 95% ethanol. The salt precipitates out immediately and is filtered off; M.P. 280–290° C.

Additional polyamide salts are prepared from the following diamines and diacids, following the above procedures:

TABLE 1

| Example | Diamine | Diacid |
|---|---|---|
| 5 | Bis (p-aminocyclohexyl) methane, 55% trans-trans isomers | Same as Example 1. |
| 6 | 4,4'-diamino-2,2'-bicyclohexyl propane | Do. |
| 7 | 2-methyl hexamethylenediamine | Same as Example 4. |
| 8 | Hexamethylene diamine | Do. |
| 9 | do | Trans 2,2 dimethyl-1,3-dicarboxy-cyclopropane (P. C. Guha and D. J. Sankoran, Ber. 70B, 1688 (1937). |
| 10 | do | Trans 1-methyl-1,2-dicarboxy cyclopropane [L. L. McCoy, J. Am. Chem. Soc. 80, 6571 (1958)]. |

B. POLYMERIZATION

Salt representative of each example is charged into a glass polymer tube and the tube purged with nitrogen, evacuated, and sealed off. The sealed tube is then heated as shown in Table 2. After this time, the tube is opened and heated under nitrogen, and then under vacuum for the times and at the temperatures shown. The resultant polymers are colorless, melt-spinnable materials. The inherent viscosity ($\eta_{inh}$) in meta-cresol, amine and carboxyl ends (in equivalents per $10^6$ gms. polymer) and polymer melt temperature (PMT) are given in the table. All temperatures are given in degrees centigrade.

TABLE 2

| Example No: | Sealed Tube Cycle | $N_2$ Cycle | Vacuum Cycle | $\eta_{inh}$ | —$NH_2$ | —$CO_2H$ | PMT,° |
|---|---|---|---|---|---|---|---|
| 1 | 220°/2 hr | 255°/1½ hr | 225°/35 min | 0.69 | 97 | | 299 |
| 2 | 220°/18½ hr | 255°/2 hr | 225°/1½ hr | 1.06 | 60 | 15 | 285 |
| 3 | 240°/3 hr | | | 0.54 | 411 | 78 | >360 |
| 4 | 300°/2 hr | 223°/1½ hr | 223°/1 hr | 0.21 | | | >400 |
| 5 | 240°/3 hr | | | 0.54 | | | |
| 6 | 250°/3 hr | 283°/1½ hr | 283°/¾ hr | 0.56 | | | |
| 7 | 300°/3 hr | 223°/1½ hr | 223°/1 hr | 0.14 | | | |
| 8 | 300°/2 hr | 223°/1½ hr | 223°/1 hr | 0.21 | | | |
| 9 | 250°/3 hr | 250°/3 hr | 283°/¾ hr | 0.17 | | | |
| 10 | 250°/2 hr | 250°/2 hr | 255°/½ hr | >0.5 | | | |

C. YARN EVALUATION

Polymer prepared according to Example 2, having an inherent viscosity in meta-cresol of 0.74, is extruded under pressure from a spinneret at a temperature of 275–285° C. The extruded yarn is drawn 4.6 times its extruded length over a hot snubbing pin at 60° C. and a hot plate at 140° C. arranged in tandem. The yarn properties are given in Table 3.

Yarn is similarly spun and drawn from a polymer prepared as in Example 3, such polymer having an inherent viscosity in meta-cresol of 0.77. Yarn properties are given in the table.

TABLE 3

| | Example 2 | | Example 3 as drawn |
|---|---|---|---|
| | As drawn | Mock finish [1] | |
| Yarn denier | 45.2 | 57.7 | |
| Birefringence | 0.0267 | 0.0354 | |
| Tenacity, room temp. g.p.d | 2.4 | 1.7 | 0.83 |
| Elongation, Room temp. percent | 10 | 33 | 6.3 |
| Initial modulus, room temp. g.p.d | 49 | 43 | 29 |
| Work recovery, 3% stretch, dry | 77 | 56 | 74 |
| Work recovery, 5% stretch, dry | 53 | 29 | 59 |
| Boiloff shrinkage, percent | | 18 | |

[1] Treatment corresponding to fabric finishing; skein boiled in water for ½ hour under tension of 0.0015 g.p.d.

Example 11

Four parts of the dimethyl ester of cyclopropane-1,2-dicarboxylic acid (trans-isomer) is mixed with 4.4 parts of 1,4-cyclohexanebis(methanol) (93% trans-isomer). To the mixture is added 5 drops of 10% solution of a catalyst, $NaHTi(OBu)_6$. The ester exchange is conducted for 1.5 hours at a temperature of 210 to 230° C., with nitrogen stirring. The mixture is then heated for ½ hour at 270° C. at one atmosphere pressure, then for ½ hour at 280° C. and 50 mm. pressure. Polymerization is completed by heating under 0.1 millimeter Hg for 2 hours at 285° C. The polyester has an inherent viscosity of 0.43 in 20% trifluoroacetic acid-80% methylene chloride. The polymer is tough, amorphous and fiber forming. The fibers are cold drawable. The polymer is slowly soluble in benzene. A film cast from methylene chloride is tough and flexible.

Example 12

Trans 1,2-diaminocyclopropane is prepared from the amide of the corresponding trans-1,2-dicarboxycyclopropane by means of a Hofmann reaction employing sodium hydroxide and sodium hypobromite.

7.2 grams of the trans-1,2-diaminocyclopropane, 50 ml. methylene chloride, 20 ml. of 5% aq. sodium lauryl sulfonate and 200 ml. ice water containing 8 grams sodium hydroxide is stirred in a blendor, 23.5 grams redistilled sebacyl chloride in 50 ml. methylene chloride is then added all at one time. After stirring for 3 minutes the contents of the Blendor jar are poured into 1 liter of stirred water and the methylene chloride boiled away on a steam bath. The resultant polymer is filtered, washed several times with water and dried. Fibers can be formed of the polyamide.

Example 13

A mixture of 5.0 g. trans-1,2-diaminocyclopropane and 5.5 g. sodium hydroxide in 90 ml. water is added to a well stirred solution of 6.87 g. of phosgene in 280 ml. of carbon tetrachloride. After stirring for 10 minutes the carbon tetrachloride is evaporated on a steam bath and polymer filtered off. After washing several times, the polymer is dried and fibers are formed thereof.

Example 14

5.0 grams of trans-1,2-diaminocyclopropane and 14.0 grams sodium carbonate are suspended in 130 ml. ice water and stirred in a blendor. A solution of 8.5 ml. (12.45 g.) ethylene bischloroformate in 40 ml. methylene chloride is added all at once. After stirring for 2 minutes the polymer mixture is poured into 650 ml. water with stirring. The methylene chloride is boiled off on a hot plate and the resultant polymer chopped up, filtered and washed well with water to yield a fiber-forming polyurethane.

What is claimed is:

1. A fiber-forming linear polycarbonamide consisting essentially of recurring structural units of the formula

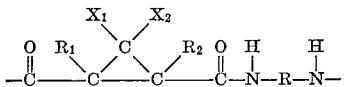

wherein R is selected from the group consisting of divalent aromatic, aliphatic, cycloaliphatic and mixed aliphatic-cycloaliphatic groups having at least four carbon atoms in each ring; $X_1$ and $X_2$ are selected from the group consisting of hydrogen, lower alkyl, lower alkoxy, phenyl, cycloaliphatic radicals, and radicals with together and with adjacent carbon atom of the cyclopropane nucleus form a cycloaliphatic radical; and $R_1$ and $R_2$ are selected from the group consisting of hydrogen, lower alkyl, lower alkoxy, and phenyl.

2. A fiber-forming linear polycarbonamide consisting essentially of recurring structural units of the formula

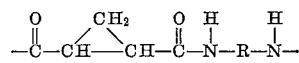

wherein R is selected from the group consisting of divalent aromatic, aliphatic, cycloaliphatic and mixed aliphaticcycloaliphatic groups having at least four carbon atoms in each ring.

3. A fiber-forming linear polycarbonamide consisting essentially of recurring structural units of the formula

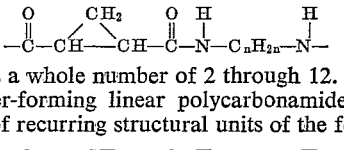

wherein $n$ is a whole number of 2 through 12.

4. A fiber-forming linear polycarbonamide consisting essentially of recurring structural units of the formula

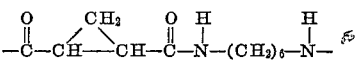

5. A fiber-forming linear polycarbonamide consisting essentially of recurring structural units of the formula

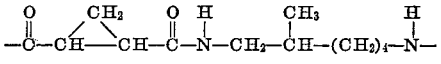

6. A fiber-forming linear polycarbonamide consisting essentially of recurring structural units of the formula:

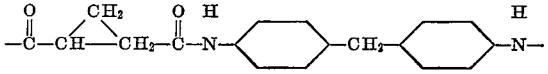

wherein the hexagon represents a cyclohexylene radical.

References Cited

UNITED STATES PATENTS

| 2,130,523 | 9/1938 | Carothers | 260—78 |
| 2,163,636 | 6/1939 | Spanagel | 260—78 |
| 2,327,131 | 8/1943 | Salzberg | 260—78 |
| 2,913,433 | 11/1959 | Wittbecker | 260—78 |
| 2,931,789 | 4/1960 | Wielicki | 260—78 |
| 3,017,395 | 1/1962 | Elam et al. | 260—78 |
| 3,074,914 | 1/1963 | Armen | 260—78 |
| 3,186,983 | 6/1965 | Steuben | 260—78 |
| 3,192,262 | 6/1965 | Schreyer | 260—78 |

OTHER REFERENCES

Shono et al.: Chemical Society of Japan Journal, Industrial Chemistry Section, the May issue, vol. 65, 1962, pp. 658–661.

Chemical Abstracts, Introduction to the Subject Index of vol. 56, 1962, pages 87–91.

W. H. SHORT, *Primary Examiner.*

H. D. ANDERSON, *Assistant Examiner.*

U.S. Cl. X.R.

260—75, 77.5, 31.2, 33.4; 264—210

PO-1050
(5/69)

UNITED STATES PATENT OFFICE
CERTIFICATE OF CORRECTION

Patent No. 3,418,287          Dated December 24, 1968

Inventor(s) Peter William Foster

It is certified that error appears in the above-identified patent and that said Letters Patent are hereby corrected as shown below:

Column 4, line 8,

"1,4-cyclohevanebis(methanol)" should read -- 1,4-cyclohexanebis(methanol) --.
(Application page 7, line 8)

Column 8, line 13,

"with" should read -- which --.
(Application claim 1, line 13)

SIGNED AND
SEALED

SEP 30 1969

(SEAL)
Attest:

Edward M. Fletcher, Jr.
Attesting Officer

WILLIAM E. SCHUYLER, JR.
Commissioner of Patents